(12) United States Patent
Rosén et al.

(10) Patent No.: US 11,940,193 B2
(45) Date of Patent: Mar. 26, 2024

(54) RESPONSIVE POWER STEERING AND REDUNDANCY

(71) Applicant: EMG Energimontagegruppen AB, Karlshamn (SE)

(72) Inventors: Per Rosén, Lund (SE); Jacob Skogström, Lomma (SE); Fredrik Rosenqvist, Helsingborg (SE)

(73) Assignee: EMG ENERGIMONTAGEGRUPPEN AB, Karlshamn (SE)

( * ) Notice: Subject to any disclaimer, the term of this patent is extended or adjusted under 35 U.S.C. 154(b) by 904 days.

(21) Appl. No.: 16/958,156

(22) PCT Filed: Dec. 20, 2018

(86) PCT No.: PCT/EP2018/086073
§ 371 (c)(1),
(2) Date: Jun. 26, 2020

(87) PCT Pub. No.: WO2019/129610
PCT Pub. Date: Jul. 4, 2019

(65) Prior Publication Data
US 2020/0363074 A1    Nov. 19, 2020

(30) Foreign Application Priority Data

Dec. 27, 2017 (EP) ..................... 17210635

(51) Int. Cl.
*F24D 19/10* (2006.01)
*F24D 10/00* (2022.01)
*F25B 49/00* (2006.01)

(52) U.S. Cl.
CPC ............ *F25B 49/00* (2013.01); *F24D 10/003* (2013.01); *F24D 2200/12* (2013.01); *F24D 2220/042* (2013.01)

(58) Field of Classification Search
CPC .. G06Q 10/063; G06Q 50/06; F24D 19/1081; F24D 10/003; F24D 19/1066; F24D 19/10
See application file for complete search history.

(56) References Cited

FOREIGN PATENT DOCUMENTS

| EP | 2664864 A1 * | 11/2013 | .......... F24F 11/0012 |
| EP | 2664864 A1 | 11/2013 | |

(Continued)

OTHER PUBLICATIONS

Office Action dated Feb. 22, 2022, in corresponding Korean patent Application No. 10-2020-7021209, 4 pages.

(Continued)

*Primary Examiner* — Frantz F Jules
*Assistant Examiner* — Martha Tadesse
(74) *Attorney, Agent, or Firm* — XSENSUS LLP (57) ABSTRACT

The disclosure relates to a method for controlling a thermal distribution system. The method comprises producing heat at a production plant, and determining a capacity limit of the production plant. At a central server, the current and/or forecasted production of heat in the production plant in relation to the capacity limit of the production plant is evaluated. The method further comprises to in response to the current or forecasted production at the production plant approaching the capacity limit, output from the central server a respective control signal to one or more of a plurality of local control units, and receiving the control signal at the respective local control unit. The method further comprises to in response to receiving the control signal at the respective local control unit, reduce an associated local distribution system's outtake of heat or cold from a distribution grid connected to the production plant.

11 Claims, 5 Drawing Sheets

(56) References Cited

FOREIGN PATENT DOCUMENTS

| EP | 3082010 A1 | 10/2016 | | |
|---|---|---|---|---|
| JP | 2013155988 A | * | 8/2013 | ............ F24D 10/00 |
| WO | 2007/136344 A1 | | 11/2007 | |
| WO | WO-2007136344 A1 | * | 11/2007 | ............ F24D 10/00 |
| WO | 2013/115286 A1 | | 8/2013 | |

OTHER PUBLICATIONS

International Search Report and Written Opinion dated Apr. 9, 2019 for PCT/EP2018/086073 filed on Dec. 20, 2018, 13 pages.

Wernstedt, F., et al., "Intelligent Distributed Load Control", The 11th International Symposium on District Heating and Cooling, Aug. 31 to Sep. 2, 2008, 6 pages.

Notification of Transmittal of the International Preliminary Report of Patentability dated Jan. 10, 2020 for PCT/EP2018/086073 filed on Dec. 20, 2018, 8 pages.

Notice of Allowance dated Nov. 12, 2021, in corresponding Chinese patent Application No. 201880081189.8, 6 pages.

Intention to Grant dated Sep. 30, 2021, in corresponding European patent Application No. 18830254.1, 38 pages.

Letters Patent No. 2750577 issued on Jun. 29, 2021, in corresponding Russian patent Application No. 2020122527, only front page.

\* cited by examiner

RESPONSIVE POWER STEERING AND REDUNDANCY

CROSS-REFERENCE TO RELATED APPLICATIONS

The present application is based on PCT filing PCT/EP2018/086073, filed Dec. 20, 2018, which claims priority to EP 17210635.3, filed Dec. 27, 2017, the entire contents of each are incorporated herein by reference.

FIELD OF INVENTION

The invention relates to a method for controlling a thermal distribution system.

TECHNICAL BACKGROUND

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort cooling and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer fluid, typically in the form of water, to buildings of the city. A centrally placed heating and pumping plant is used for heating and distributing the heated heat transfer fluid. The heated heat transfer fluid is delivered to the buildings via one or more feed conduits and is returned to the heating and pumping plant via one or more return conduits. Locally at a building, heat from the heated heat transfer fluid is extracted via a district heating substation comprising a heat exchanger.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer fluid, typically in the form of water, to buildings of the city. A centrally placed cooling and pumping plant is used for cooling and distributing the thus cooled heat transfer fluid. The cooled heat transfer fluid is delivered to the buildings via one or more feed conduits and is returned to the cooling and pumping plant via one or more return conduits. Locally at a building, cold from the cooled heat transfer fluid is extracted via a heat pump.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids, including existing grids. Provision of heating/cooling also requires huge investments when it comes to engineering projects and there is a constant strive to cut the costs. Hence, there is a need for improvements in how to provide sustainable solutions to heating and cooling of a city.

SUMMARY OF INVENTION

It is an object of the present invention to solve at least some of the problems mentioned above. Hence, according to an aspect a method for controlling a thermal distribution system is provided. Preferred embodiments appear in the dependent claims and in the description.

The thermal distribution system comprises a distribution grid for a fluid based distribution of heat and/or cold, a production plant for producing heat or cold and for delivering the heat or cold to the distribution grid, and a plurality of local control units. Each local control unit is associated with a local distribution system in a building. The local distribution system is configured to distribute heating or cooling in the building. Each local control unit is further configured to control the associated local distribution system's outtake of heat or cold from the distribution grid.

The local distribution system may be configured to distribute comfort heating in the building. The local distribution system may be configured to distribute comfort cooling in the building The method comprises determining a capacity limit of the production plant. At a central server, a current and/or forecasted production of heat or cold in the production plant in relation to the capacity limit of the production plant is evaluated. The method further comprises, in response to the current and/or forecasted production at the production plant approaching the capacity limit, outputting, from the central server, a respective control signal to one or more of the plurality of local control units, wherein the respective control signal comprises information pertaining to a temperature offset, and receiving the respective control signal at the respective one or more of the plurality of local control units. The method further comprises, in response to receiving respective the control signal at the respective one or more of the plurality of local control units, determining a respective steering temperature based on a temperature outside and/or inside the respective building and on the respective temperature offset, and controlling, at the respective one or more of the plurality of local control units, the associated local distribution system's outtake of heat or cold from the distribution grid based on the steering temperature, and thereby reducing the associated local distribution system's outtake of heat or cold from the distribution grid.

Usually, multiple buildings are connected to a distribution grid at different distances from a production plant providing heated and/or cooled fluid to the grid. A building close to the production plant on the grid may therefore use more than its share of heat or cold, which may lead to buildings further away on the grid do not get sufficient heating or cooling when there are limited supplies of heated or cooled fluid.

By determining a capacity limit of the production plant and the current capacity in relation to the capacity limit the capacity of the production plant may be monitored or evaluated. It may be advantageous to avoid exceeding the capacity limit as that increases the risk for overloading the system, i.e. not being able to provide enough heating or cooling to all the buildings on the distribution grid. Hence, a central server may determine whether the current or forecasted capacity is approaching the determined capacity limit.

If the central server determines that the current or forecasted capacity is approaching a capacity limit of the production plant, the central server may output or send a control signal. The control signal may, for example, be adapted to be received by a local control unit, and be indicative of a change in outtake for a local distribution system. In this way, the central server may affect or control, via a local control unit, a local distribution system's outtake of heat or cold from a distribution grid. For example, the control signal may be indicative of a decrease or increase in an outtake of heat or cold from a distribution grid. By the central server controlling the outtake via the control signal, the outtake of heat or cold may be adapted to the production plant's current or forecasted production.

By adapting the outtake of heat or cold to the production plant's current or forecasted production, the distribution of heat or cold in the system may be more reliable. For example, if a local distribution system close to the plant on the distribution grid outtakes or consumes less heat or cold, there may be sufficient heat or cold for local distribution systems further away on the distribution grid.

Further, by adapting the outtake, temporary peaks in outtake from the system may be mitigated without having to start additional generators of heat or cold at the production plant or to start an additional production plant. This may lead to lower climate impact (since top load units normally are less environmentally friendly) or decreased costs, in comparison to having to start additional generators or additional productions plants. A good optimization may also lead to less consumption needs of the connected buildings. Further, this may lead to an increased availability of the thermal distribution system, as the risk for overloading the system is decreased.

It will be appreciated that the term "thermal distribution system" relates any system for distributing thermal energy. For example, it may relate to a system for distributing heat or a system for distributing cold. According to another example, it may relate to a combined system for distributing both heat and cold.

A "production plant" may be any type of production plant suitable for producing heat or cold and for delivering the heat or cold to a distribution grid. The production plant comprises one or more generators for heat or cold. Each generator may be run independently of the other generators at the production plant. The "distribution grid" may be any means for distributing heat or cold via a feed of a heat transfer fluid to a building or system.

By "capacity" is meant the current or forecasted capacity of the production plant to produce heat or cold. The capacity may have one value if the production plant is operating at a normal level, and may be decreased if the production plant operation level is reduced or disturbed. It may also be increased if the capacity is increased, for example, if an additional generator of heat or cold is started.

A "forecasted production" is the system's knowledge of an expected future production, for example, that a generator has been started and is not yet fully operational, but is expected to be fully operational within a short time period. Another example is that a generator at the production plant is turned off, or will soon be turned off. The system may then forecast that the capacity may decrease in a short period of time.

I will be appreciated that the terms "heat or cold", "heat" or "cold" is interpreted as energy for changing a temperature in a building, either by increasing or decreasing the temperature.

A "local control unit" may be any type of processing unit adapted for controlling a local distribution system. A local control unit may be used for one or a plurality of local distribution systems.

A "central server" may be any type of processing unit suitable for performing at least some of the steps of the method specified above. The central server may be one or more servers. It may be "central" in the sense that it may handle data for a plurality of local control units. The central server may also be configured to send a control signal to one or more local control units.

By "outtake" is meant a local distribution system's consumption or use of heat or cold from the distribution grid.

The "control signal" may be any signal for communicating between the central server and the one or more local control units. It may, for example, be an analog or a digital signal.

It has been realized that by controlling local control units via a central server, based on the capacity limit of the production plant, the outtake of heat or cold in the system may be adapted accordingly. This may decrease the risk of overloading the production plant, or not being able to provide enough heat or cold for all the buildings on the grid. When it has been determined that the capacity limit is approached, at least one of the plurality of local control units may receive a control signal causing them to reduce the local distribution systems' outtake of heat or cold from the grid. This allows for adapting the outtake of heat or cold from the system, which may decrease the risk of overloading the production plant and increasing the stability of the system.

Further, by controlling local control units via a central server, based on the capacity limit of the production plant, unnecessary starting of additional generators may be avoided. By limiting the local distribution system's outtake or use of energy from the distribution grid, the need for starting additional generators during peak times may be decreased as the system may operate on the already present amount of heat or cold in the system. This may lead to a decrease in the operating costs.

The act of evaluating may be performed periodically. Periodically may be interpreted as performed regularly with a time interval. For example, the evaluation may be performed every minute, every five minutes, every fifteen minutes, every hour or another suitable time interval.

By evaluating the current and/or forecasted production of heat in the production plant in relation to the capacity limit of the production plant periodically, it may be realized that the production plant is approaching its capacity limit before the capacity limit is reached. The system may then adjust the outtake of heat or cold from the system to avoid overloading the production plant and to more efficiently or fairly use the available capacity, i.e. avoiding that any local distribution system does not get any heat or cold.

The method may further comprise setting a production threshold value lower than and related to the capacity limit of the production plant. The act of evaluating may comprise comparing the current production with the production threshold value, and upon the current production reaching the production threshold value determining that the current production at the production plant approaches the capacity limit.

There may be more than one threshold value indicating different levels of the capacity of the production plant.

In this way, the central server may earlier determine that the current production is approaching the capacity limit. When the central server may earlier determine that the capacity limit is approached, measure for avoiding overloading the system or measure for controlling the outtake of heat or cold from the system may be taken. That is, the central server may earlier, in comparison to not using a threshold, control the outtake of heat or cold from the system.

The method may further comprise determining a temperature outside the respective building, wherein each local control unit is configured to control the associated local distribution system's outtake of heat or cold from the distribution grid based on the determined temperature outside the respective building.

For example, if the temperature is relatively high, the outtake of heat may be decreased or the outtake of cold may be increased. Alternatively, if the temperature is relatively low, the outtake of heat may be increase or the outtake of cold may be decreased. Each local control unit may be adapted to determine if the temperature is relatively high or relatively low and control the associated local distribution system accordingly.

By adapting the local distribution system's outtake, the risk of overloading the system may be further decreased. Further, by not consuming more heat or cold than is needed, the outtake of heat or cold may be more energy efficient. As the outtake may be adapted to the current production of heat or cold by the production plant, the outtake may be more evenly divided among the local distribution systems, which may lead to a more efficient thermal distribution system.

The method may further comprise determining, at the respective local control unit, a base steering temperature for the associated local distribution system based on the determined temperature outside the building and controlling, at the respective local control unit, the associated local distribution system's outtake of heat or cold from the distribution grid based on the base steering temperature.

A local control unit may determine a base steering temperature, i.e. a temperature steering the heating or cooling. The base steering temperature may be determined based on the temperature outside the building. In this way, the outtake may be adapted to the temperature outside the building. For example, if the temperature outside the building is relatively low, the outtake of heat may be relatively high, and correspondingly, if the temperature outside the building is relatively high, the outtake of heat may be relatively low. According to another example, if the temperature outside the building is relatively low, the outtake of cold may be relatively low, and correspondingly, if the temperature outside the building is relatively high, the outtake of heat may be relatively high.

The base steering temperature may be a set-point temperature for a regulator regulating the temperature of a feed of heat transfer fluid in the local distribution system. The regulator may be any type of regulator suitable for regulating a temperature of a feed of heat transfer fluid. For example, the regulator may be a P, PI, PID-controller or more advanced cascaded controllers. It will be appreciated that heat transfer fluid may be used both for transferring heat and cold. The regulator may in this way influence the local distribution system's outtake or use of heat or cold.

The control signal to at least one local control unit may comprise information pertaining to a temperature offset, wherein the method may further comprise determining a reduced steering temperature based on the determined temperature outside the building and on the temperature offset. The reduced steering temperature may be determined at the at least one local control unit. The at least one local control unit nay be configured to control the associated local distribution system's outtake of heat from the distribution grid based on the reduced steering temperature. Hence, the associated local distribution system's outtake of heat from the distribution grid may be reduced. This will lead to that a more uniform outtake of heat from the distribution grid may be achieved. Further, at high demand of heat outtake from the distribution grid it may be safeguarded that most, or all, local distribution systems may get at least some heat.

Alternatively, the method may further comprise determining an increased steering temperature based on the determined temperature outside the building and on the temperature offset. The increased steering temperature may be determined at the at least one local control unit. The at least one local control unit may be configured to control the associated local distribution system's outtake of cold from the distribution grid based on the increased steering temperature. Hence, the associated local distribution system's outtake of cold from the distribution grid may be reduced. This will lead to that a more uniform outtake of cold from the distribution grid may be achieved. Further, at high demand of cold outtake from the distribution grid it may be safeguarded that most, or all, local distribution systems may get at least some cold.

The temperature offset may be an actual temperature value added to the original steering temperature. The actual value may be a positive or negative value. Alternatively, the temperature offset may be a percentage value to be applied to the original steering temperature.

In this way, the central server may, via the control signal, affect the base steering temperature by an offset, increasing or decreasing the temperature.

The method may further comprise determining a return temperature of a return of heat transfer fluid in the associated local distribution system for transporting heat, and upon the determined reduced steering temperature being lower than the return temperature, determining a temporary steering temperature being higher than the return temperature and lower than the base steering temperature, and controlling the associated local distribution system's outtake of heat from the distribution grid based on the temporary steering temperature.

Alternatively, or in combination, the method may further comprise determining a return temperature of a return of heat transfer fluid in the associated local distribution system for transporting cold, and upon the determined increased steering temperature being higher than the return temperature, determining a temporary steering temperature being lower than the return temperature and higher than the base steering temperature, and controlling the associated local distribution system's outtake of cold from the distribution grid based on the temporary steering temperature.

In this way, the steering temperature may be determined based on the return heat transfer fluid, i.e. the temperature may be based on how much heat or cold was used by the local distribution system. That is, the steering temperature may be gradually increased or decreased. In alternative solutions, to reach a determined steering temperature in the local distribution, a control valve may have to be closed for a period of time. This solution has the risk of being interpreted by persons in the building as that the system is malfunctioning, which may have lead them to contact the distributor. In contrast, by gradually increasing or decreasing the steering temperature, the control valve will not have to be closed, thereby avoiding any confusion of users of the local distribution system. Further, it will protect the control valve from malfunctioning. This since repeated fully closing and subsequent opening of the control valve may induce wear to the control valve.

The method may further comprise, over time, determining the return temperature of the return of heat transfer fluid in the associated local distribution system, and gradually decreasing the temporary steering temperature while securing that the temporary steering temperature is greater than the return temperature, until the temporary steering temperature reaches the reduced steering temperature. This is especially valid for implementations wherein heat is withdrawn from the local distribution system. Alternatively, or in combination, the method may further comprise, over time, determining the return temperature of the return of heat transfer fluid in the associated local distribution system, and gradually increasing the temporary steering temperature while securing that the temporary steering temperature is less than the return temperature, until the temporary steering temperature reaches the increased steering temperature.

In this way, the steering temperature may be determined based on the return heat transfer fluid, i.e. the temperature may be based on how much heat or cold was used by the local distribution system. That is, the steering temperature may be gradually increased or decreased. In alternative solutions, to reach a determined steering temperature in the local distribution system, a control valve may have to be closed for a period of time. This solution has the risk of being interpreted by persons in the building as that the system is malfunctioning, which may have lead them to contact the distributor. In contrast, by gradually increasing or decreasing the steering temperature, the control valve will not have to be closed, thereby avoiding any confusion of users of the local distribution system. Further, it will protect the control valve from malfunctioning, since repeated fully closing and subsequent opening of the control valve may induce wear to the control valve.

The method may further comprise, until the temporary steering temperature reaches the reduced steering temperature, over time, determining a temperature of the feed of heat transfer fluid in the associated local distribution system and in response to the determined feed temperature reaching the temporary steering temperature, determining the return temperature of the return of heat transfer fluid in the local distribution system. The method may further comprise determining a new temporary steering temperature being higher than the determined return temperature and lower than the previous temporary steering temperature.

Alternatively, or in combination, the method may further comprise until the temporary steering temperature reaches the increased steering temperature, over time, determining a temperature of the feed of heat transfer fluid in the associated local distribution system, and in response to the determined feed temperature reaching the temporary steering temperature, determining the return temperature of the return of heat transfer fluid in the local distribution system. The method may further comprise determining a new temporary steering temperature being lower than the determined return temperature and higher than the previous temporary steering temperature.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. It will also be appreciated that embodiments may be combined advantageously.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will by way of example be described in more detail with reference to the appended schematic drawings, which shows a presently preferred embodiment of the invention.

FIG. 3 is a flow diagram of the method, according to some embodiments.

All figures are schematic, not necessarily to scale, and generally only show parts which are necessary in order to elucidate the embodiments, wherein other parts may be omitted.

DETAILED DESCRIPTION OF PREFERRED EMBODIMENTS

Detailed embodiments of the present inventive concept will now be described with reference to the drawings. The present inventive concept, may, however, be embodied in many different forms and should not be construed as limited to the embodiments set forth herein; rather, these embodiments are provided by way of example so that this disclosure will convey the scope of the inventive concept to those skilled in the art.

Figure 1:
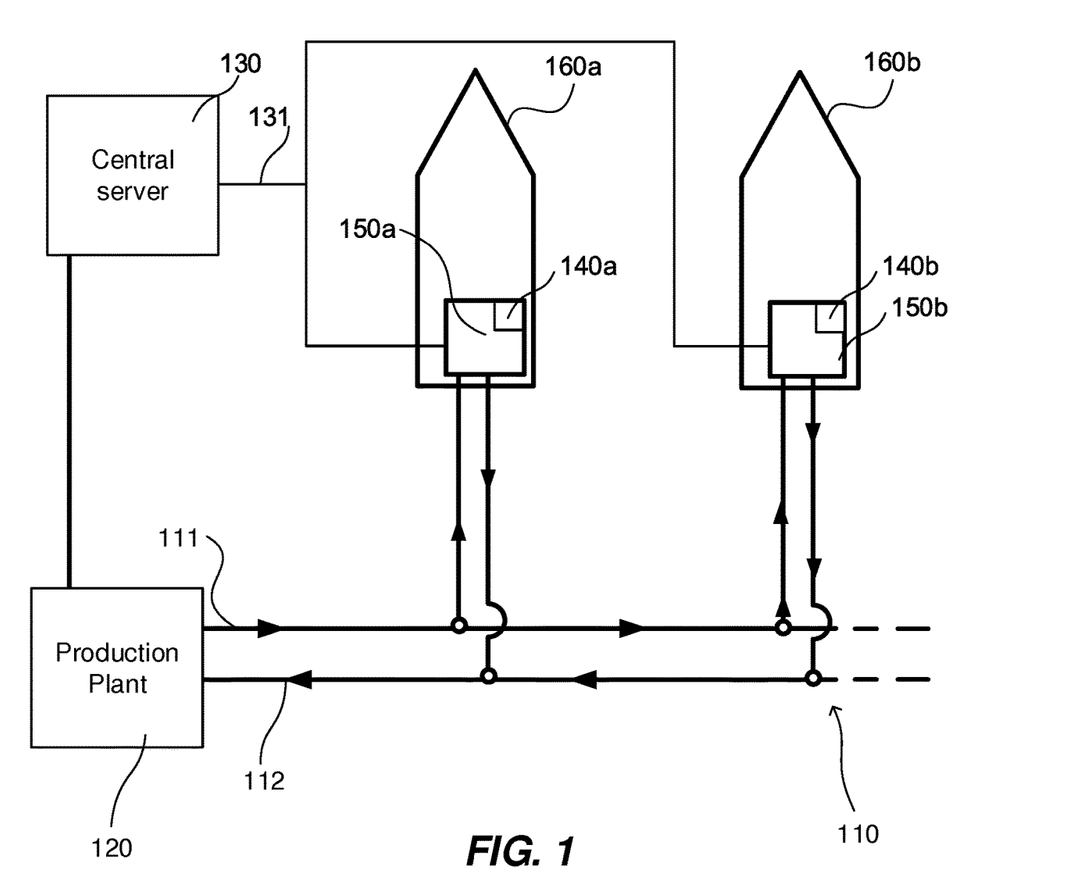
FIG. 1 is a schematic diagram of a thermal distribution system.

An example of a thermal distribution system 100 is schematically illustrated in connection with FIG. 1. The thermal distribution system comprises a distribution grid 110 for fluid based distribution of heat and/or cold and a production plant 120 for producing heat or cold and for delivering the heat or cold to the distribution grid 110. The thermal distribution system also comprises a plurality of local control units 140a, 140b, each associated with a local distribution system 150a, 150b. In the in FIG. 1 shown example two local control units 140a, 140b, each associated with a local distribution system 150a, 150b are shown. It is however contemplated that any number of local control units may be used. Further, each local control unit may be configured to service one or more local distribution system 150a, 150b.

Each local distribution system 150a, 150b is configured to provide heat and/or cold to one or more buildings 160a, 160b. The buildings 160a, 160b, may be office buildings, business premises, residential homes, factories or other buildings in need for heat and/or cold. In the in FIG. 1 shown example each local distribution system 150a, 150b is configured to provide heat and/or cold to one respective building 160a, 160b. However, each local distribution system 150a, 150b may be configured to provide heat and/or cold to a plurality of buildings.

The local distribution systems 150a, 150b are connected with the distribution grid 110 such that heat and/or cold may be exchanged between the distribution grid 110 and the respective local distribution system 150a, 150b. The exchange of heat and/or cold between the distribution grid 110 and the respective local distribution system 150a, 150b may be made using a heat exchanger. Alternatively, the exchange of heat and/or cold between the distribution grid 110 and the respective local distribution system 150a, 150b may be made using heat pump.

The distribution grid 110 may be formed by a hydraulic network that deliver a heat transfer fluid. The heat transfer fluid is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

The production plant 120 is configured to heat or cool the heat transfer fluid of the distribution grid 110. The heated or cooled heat transfer fluid may be transported via a feed conduit 111. Return heat transfer fluid may be transported via a return conduit 112 to the production plant 120. In the case of the heated heat transfer fluid is transported via the feed conduit 111 and cooled heat transfer fluid is returned via the return conduit 112 the distribution grid 110 may be considered as a district heating grid. In the case of the cooled heat transfer fluid is transported via the feed conduit 111 and heated heat transfer fluid is returned via the return conduit 112, the distribution grid 110 may be considered as a district cooling grid. According to another embodiment the distribution grid 110 may be a district thermal energy distribution system as disclosed in WO 2017/076868. In such case the feed conduit 111 may be considered to be the hot conduit disclosed in WO 2017/076868 and the return conduit 112 may be considered to be the cold conduit disclosed in WO 2017/076868.

The local distribution system 150a, 150b is configured to distribute heat and/or cold in the building 160a, 160b. The local distribution system may distribute heat or cold in the building via a heat transfer fluid. The heat transfer fluid is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

The local control unit 140a, 140b is configured to control the associated local distribution system's 150a, 150b outtake of heat and/or cold from the distribution grid 110. The heat transfer fluid of the local distribution system 150a, 150b is typically not in fluid connection with the heat transfer fluid of the distribution grid 110. As mentioned above, the distribution system 150a, 150b is thermally connected to the distribution grid 110 via a heat exchanger or a heat pump.

The thermal distribution system 100 further comprises a central server 130. The central server 130 is connected to the production plant 120 and to the local control units 140a, 140b. The central server 130 may be any type of server comprising a processing unit. The central server 130 may physically comprise one single server device. Alternatively, the central server 130 may be distributed over several server devices. The central server 130 may be comprised in a production plant 120, or at any other suitable location. The central server 130 is configured to communicate with the production plant 120. The central server may communicate with the production plant 120, for example, via a dedicated network, over the Internet, or a combination thereof. The central server 130 is further configured to communicate with the local control units 140a, 140b, for example, via a dedicated network, over the Internet or a combination thereof. The communication in the dedicated network or the Internet may be wireless and/or wired.

The central server 130 is configured to determine a capacity limit of the production plant 120. Further, the central server 130 is configured to determine and a current or forecasted capacity for the production plant 120. The central server 130 is further configured to send a control signal 131 to at least one of the plurality of local control units 140a, 140b.

The local control unit 140a, 140b may be configured to, in response to a control signal from the central server 130, decrease or increase the local distribution system's 150a, 150b outtake of heat or cold from the distribution grid 110.

The local control unit 140a, 140b may be configured to determine a temperature from outside and/or inside of the building 160a, 160b. The local control unit 140a, 140b may be configured to decrease or increase the local distribution system's 150a, 150b outtake of heat and/or cold from the distribution grid 110 based on the determined temperature.

Figure 2:
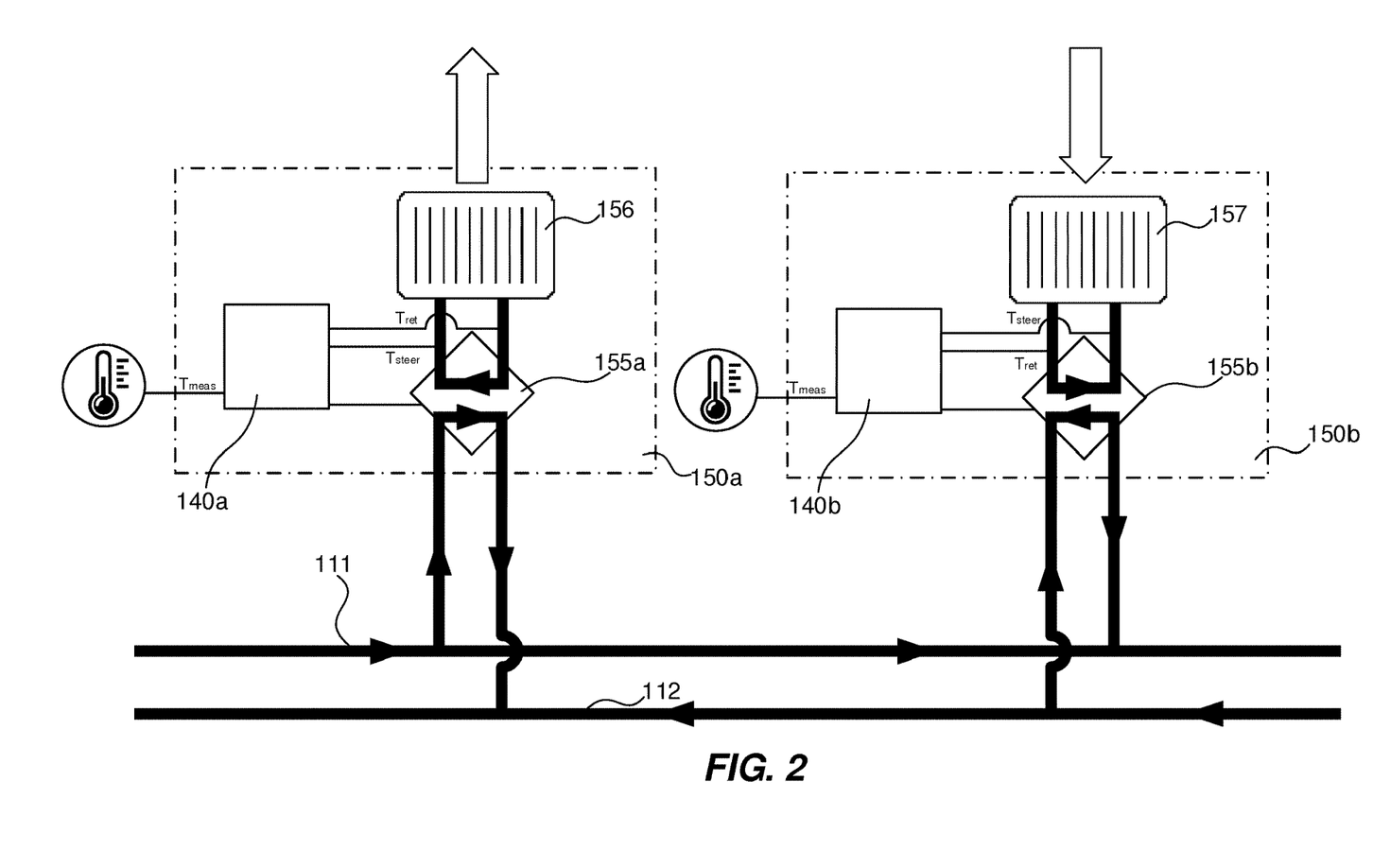
FIG. 2 is a schematic diagram of two different local distribution systems.

Two examples of a local distribution systems 150a, 150b will now be described with reference to FIG. 2. The local distribution system 150a is configured to distribute heating in a building. The heating may be in form of comfort heating, hot tap water and/or any other heating need of a building. The local distribution system 150b is configured to distribute cooling in a building. The cooling may be comfort cooling, cooling for refrigeration or freezing purposes, and/or any other cooling need of a building. The local distribution systems 150a, 150b may be arranged in one and the same building. Alternatively, the local distribution systems 150a, 150b may be arranged in different buildings.

The local distribution system 150a comprises a local control unit 140a, a device 155a configured to exchange thermal energy between the local distribution system 150a and the distribution grid 110 and a heat emitter 156. In the in FIG. 2 shown example the device 155a configured to exchange thermal energy between the local distribution system 150a and the distribution grid 110 is a heat exchanger. However, device 155a configured to exchange thermal energy between the local distribution system 150a and the distribution grid 110 may instead be a heat pump. The use of a heat exchanger or heat pump is depending on the temperature of the heat transfer fluid in the distribution grid 110 and the wanted temperature of the heat transfer fluid of the local distribution system 150a. Via the device 155a configured to exchange thermal energy between the local distribution system 150a and the distribution grid 110, heat from the distribution grid 100 is distributed to the local distribution system 150a. Heat may thereafter be emitted to the building wherein the local distribution system 150a is located via the heat emitter 156. The local distribution system 150a may comprise one or more heat emitters 156. The local control unit 140a is configured to control the associated local distribution system's 150a outtake of heat from the distribution grid 110. The local control unit 140a is adapted to receive a control signal from the central server 120 and to control the associated local distribution system's 150a outtake of heat from the distribution grid 110 according to the received control signal.

The local distribution system 150b comprises a local control unit 140b, a device 155b configured to exchange thermal energy between the local distribution system 150b and the distribution grid 110 and a heat absorber 157. In the in FIG. 2 shown example the device 155b configured to exchange thermal energy between the local distribution system 150b and the distribution grid 110 is a heat exchanger. However, device 155b configured to exchange thermal energy between the local distribution system 150b and the distribution grid 110 may instead be a heat pump. The use of a heat exchanger or heat pump is depending on the temperature of the heat transfer fluid in the distribution grid 110 and the wanted temperature of the heat transfer fluid of the local distribution system 150b. Via the device 155b configured to exchange thermal energy between the local distribution system 150b and the distribution grid 110, heat from the distribution grid 100 is distributed to the local distribution system 150b. Heat may thereafter be absorbed from the building wherein the local distribution system 150b is located via the heat absorber 157. The local distribution system 150b may comprise one or more heat absorbers 157. The local control unit 140b is configured to control the associated local distribution system's 150b outtake of cold from the distribution grid 110. The local control unit 140b is adapted to receive a control signal from the central server 120 and to control the associated local distribution system's 150b outtake of cold from the distribution grid 110 according to the received control signal.

The local control unit 140a, 140b may control the local distribution system's 150a, 150b outtake of heat or cold from the distribution grid 100 via a steering signal $T_{steer}$. The local control unit 140a, 140b or the local distribution system 150a, 150b may comprise a PID-controller to control an outtake from the distribution grid 110 via the device 155a, 155b configured to exchange thermal energy between the local distribution system 150a, 150b and the distribution grid 110.

The local control unit 140a, 140b may be configured to determine a temperature $T_{mes}$ and decrease or increase the local distribution system's 150a, 150b outtake of heat or cold from the grid 110 based on the determined temperature. In the case of the local distribution system 150a being a system for emitting heat into the building $T_{mes}$ is typically determined just outside the building wherein the local distribution system 150a is located. In the case of the local distribution system 150b being a system for absorbing heat from the building $T_{mes}$ is typically determined inside the building.

A sensor may be arranged to sense a return temperature $T_{ret}$ of heat transfer fluid entering the device 155b configured to exchange thermal energy between the local distribution system 150a, 150b and the distribution grid 110. The sensor may be connected to the local control unit 140a, 140b associated with the local distribution system 150a, 150b.

A method for controlling the thermal distribution system 100 is described with reference to FIG. 3. It will be appreciated that in FIG. 3 the term "TSP" is an abbreviation for "temporary steering temperature". The nodes A and B have been inserted to clarify the flow chart for the method between FIG. 3-1, FIG. 3-2 and FIG. 3-3 and are not part of the method. FIG. 3-1 shows a flow diagram for a method applicable to distribution systems for both heat and cold. FIG. 3-2 shows a flow diagram for a part of the method related to distribution of heat and FIG. 3-3 shows a flow diagram for a part of the method related to distribution of cold.

Figure 31:
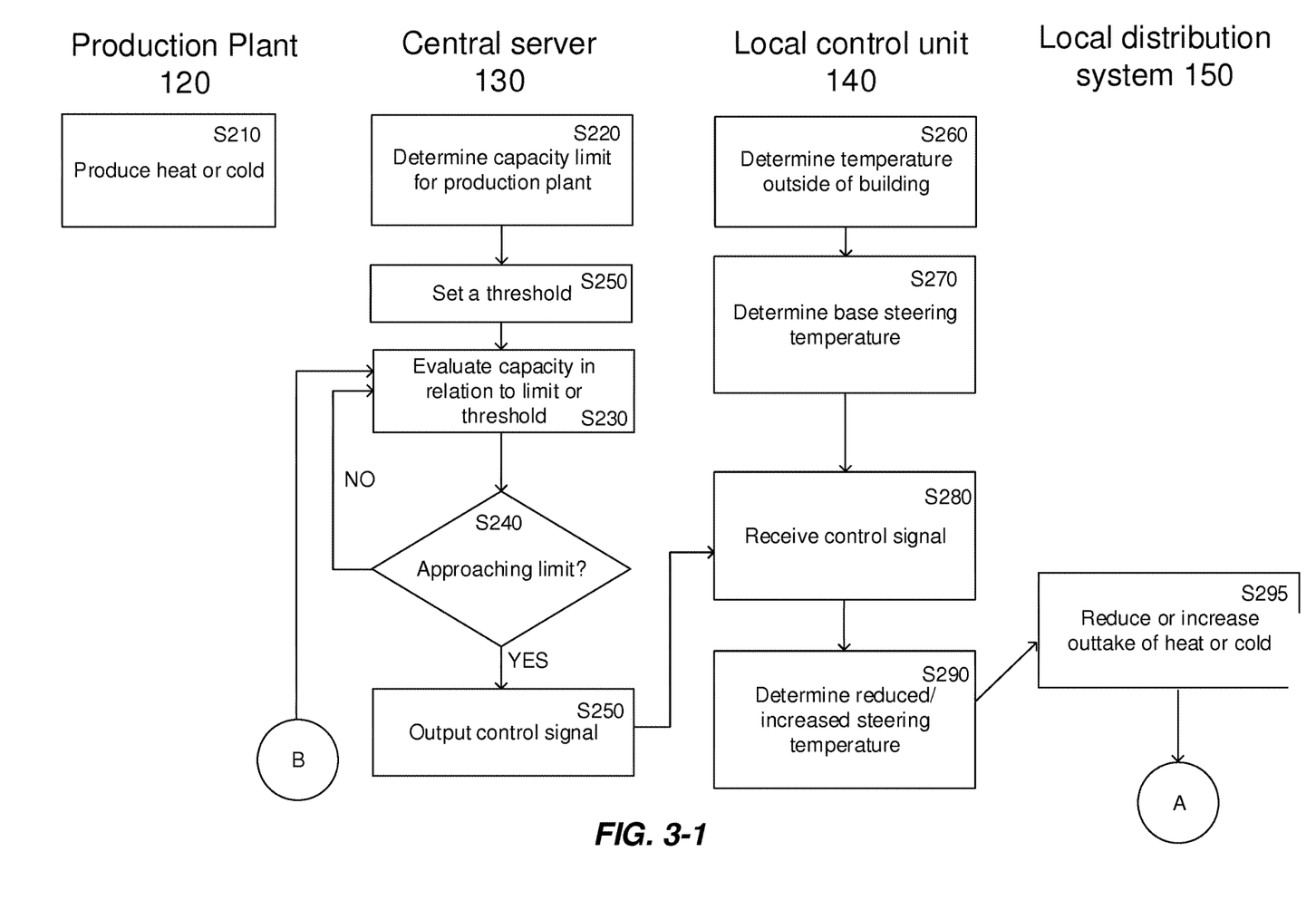

The method comprises producing S210 heat or cold at the production plant 120. The method 200 further comprises, at the central server 130, determining S220 a capacity limit of the production plant 110. The central server 130 may evaluate S230 the current or a forecasted production capacity in relation to the capacity limit. The central server 130 may determine S240 if the current or forecasted production at the production plant is approaching the capacity limit.

The central server 120 may further set S225 a production threshold, related to or based on the determined capacity limit, and lower than the determined capacity limit. If the server has set a production threshold, the act of evaluating S230 may comprise comparing the current production with the production threshold value. If so, the method further comprises determining S240, upon the current production reaching the production threshold value, that the current production at the production plant approaches the capacity limit.

In response to being determined S240 that a current or forecasted production at the production plant is approaching the capacity limit or the production threshold, the central server 130 may output S250 a control signal. If it is not determined S240 that the capacity limit is being approached, the central server may continue to monitor the capacity level of the production plant, in steps S220 or S230.

The control signal may, for example, be a temperature offset. The offset may be an actual temperature value with which a local control unit should adjust the outtake from the distribution grid. The actual value may be a positive or negative value. The offset may be a percentage value to be applied to the current or calculated outtake. The offset may be determined according to the inertia of each building combined with the need to steer their aggregated need of effect connected to production units. Larger offset to handle larger steering needs and smaller offset to handle smaller steering needs.

Independently, a local control unit 140 may determine S260 a temperature $T_{mes}$. $T_{mes}$ may be determined outside of the building with which it is associated. Alternatively, $T_{mes}$ may be determined inside the building. The local control unit 140 may be configured to control the associated local distribution system's 150 outtake of heat or cold from the distribution grid based on the determined temperature. The local control unit 140 may further determine S270 a base steering temperature for the associated local distribution system 150 based on the determined temperature. The base steering temperature is a temperature controlling the distribution system's 150 outtake of heat or cool from the distribution grid 110. The base steering temperature may be a set-point temperature for the heat transfer fluid.

The control signal is received S280 at the local control unit 140. The local control unit 140 may adjust the associated local distribution system's 150 outtake of heat or cold from the distribution grid 110 based on the control signal. For example, the local control unit 140 may adjust the base steering temperature based on an offset received via the control signal. If the control signal indicates a temperature value, the local control unit 140 may apply the value on the steering temperature, or if the control signal indicates a percentage value the local control unit 140 may apply the percentage on the steering temperature. For example, the offset may be added or subtracted from the base steering temperature. The local control unit 140 may thereby determine S290 a reduced or increased steering temperature. The reduced or increased steering temperature may be used until another control signal is received. The outtake of the local distribution system 150 may be adapted S295 accordingly.

It will be appreciated that the steps S210, S220-S250, S260-S270 and S280-S205 may be performed independently, and that all steps are optional. Some steps may be performed several times, other may be omitted or performed a small amount of times.

In some examples of the method, the local control unit 140 may further reduce or increase the steering temperature based on a return temperature, $T_{ret}$, of the local distribution system. The local control unit 140 or a local distribution system 150 may determine S310 the return temperature of a return of heat transfer fluid in the local distribution system 150.

Figure 32:
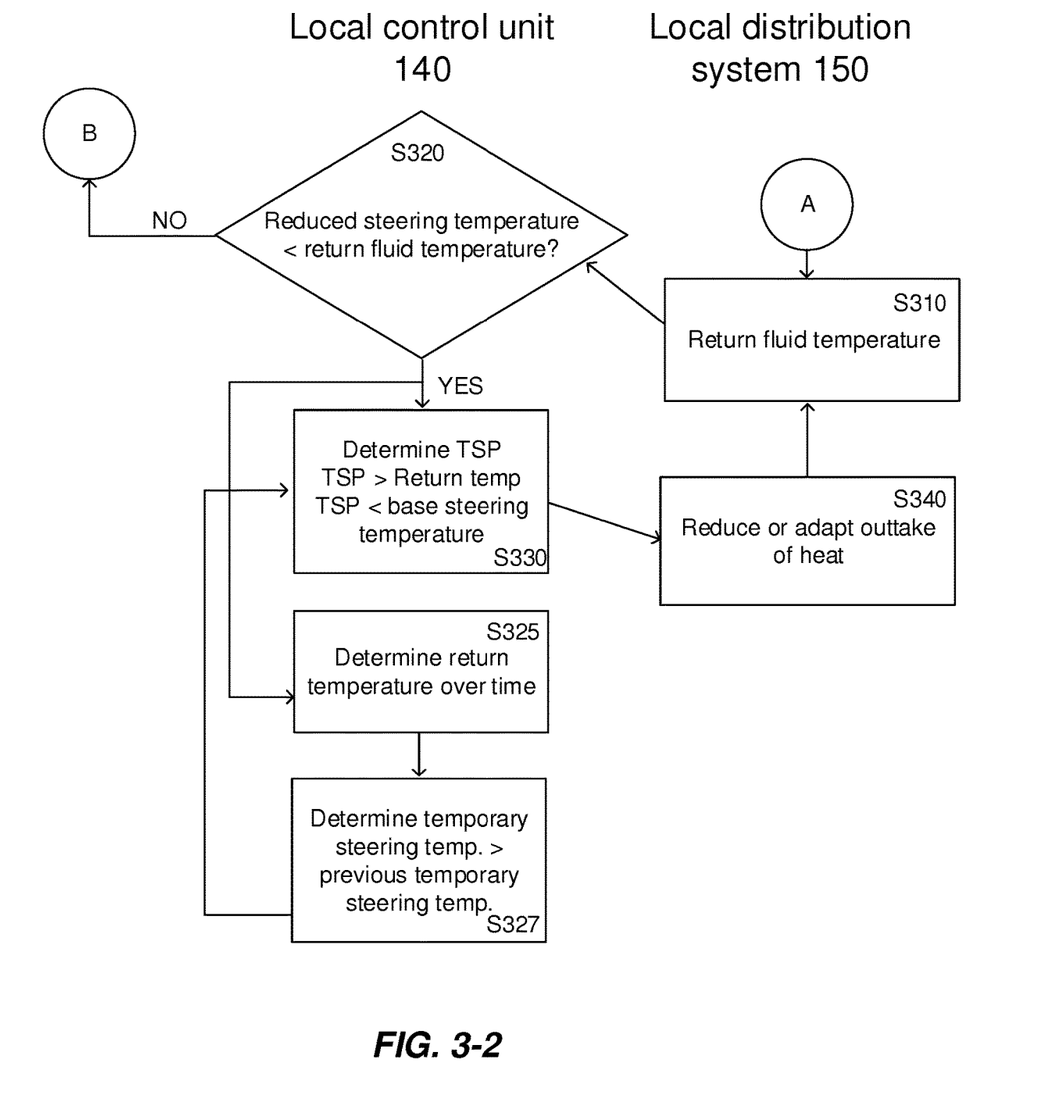

In case of heat is taken out from the distribution grid 110, the local control unit 140 may determine S320 that a determined reduced steering temperature is lower than the return temperature. If the reduced steering temperature is lower than the return temperature, the local control unit 140 may determine S330 a temporary steering temperature that is higher than the return temperature and lower than the base steering temperature. The local control unit 140 may thereby reduce the local distribution system's 150 outtake of heat in step S340. If the reduced steering temperature is not lower than the return temperature, the local control unit 140 may not adapt the reduced steering temperature.

The method may further comprise determining S325 the return temperature of the return of heat transfer fluid in the local distribution system over time, and gradually decreasing S327 the temporary steering temperature while securing that the temporary steering temperature is greater than the return temperature, until the temporary steering temperature reaches the reduced steering temperature. This may be achieved by performing steps S310, S320, S325, S327, S330 and S340 until the temporary steering temperature reaches the reduced steering temperature.

Figure 33:
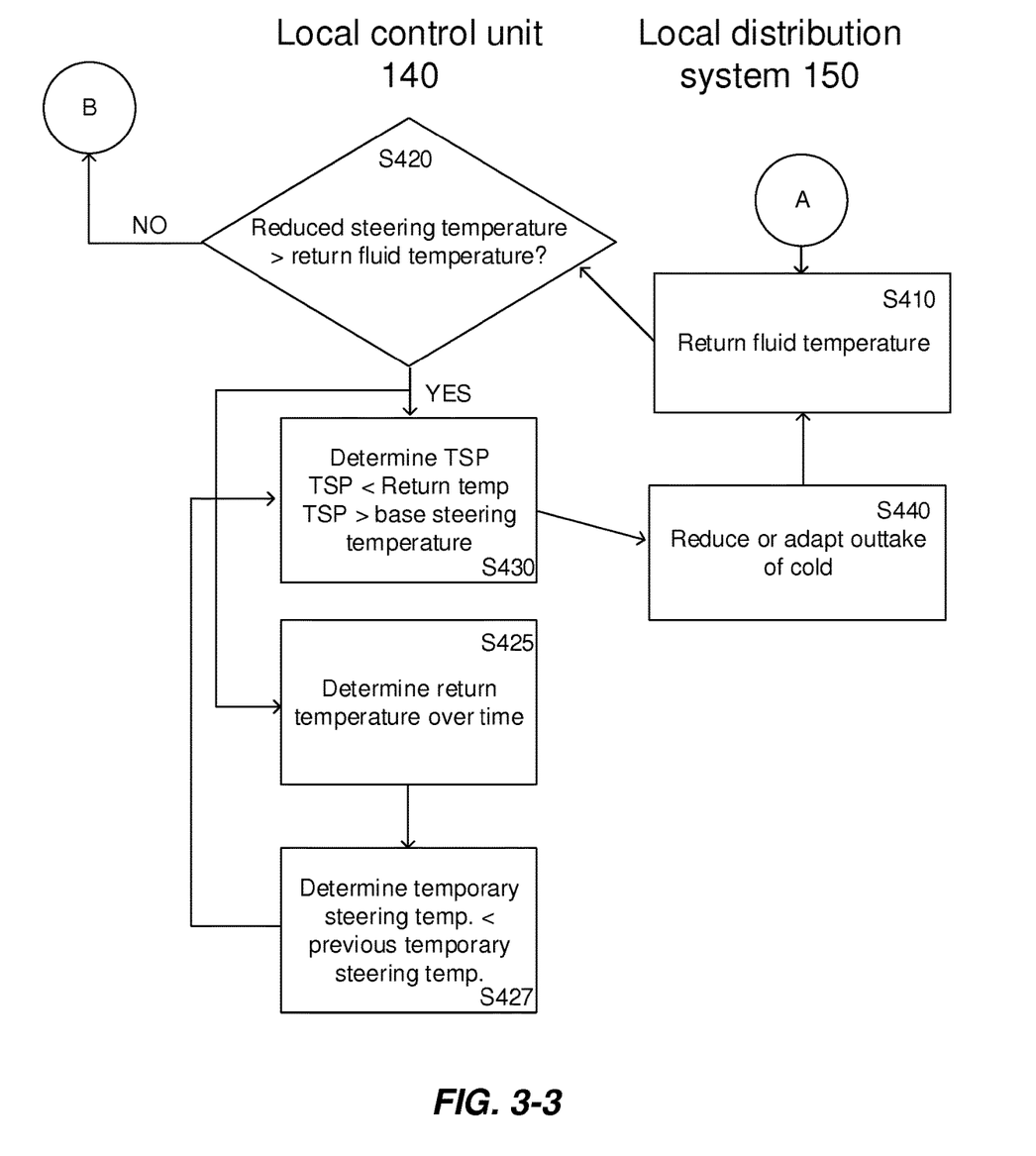

In case of cold is taken from the distribution grid 110, the local control unit 140 may determine S420 that a determined increased steering temperature is higher than the return temperature. If the increased steering temperature is higher than the return temperature, the local control unit 140 may determine S430 a temporary steering temperature that is lower than the return temperature and higher than the base steering temperature. The local control unit 140 may thereby increase the local distribution system's 150 outtake of cold in step S440. If the increased steering temperature is not higher than the return temperature, the local control unit 140 may not adapt the increased steering temperature.

The method may further comprise determining S425 the return temperature of the return of heat transfer fluid in the local distribution system 150 over time, and gradually increasing S427 the temporary steering temperature while securing that the temporary steering temperature is lower than the return temperature, until the temporary steering temperature reaches the increased steering temperature. This may be achieved by performing steps S410, S420, S425, S427, S430 and S440 until the temporary steering temperature reaches the increased steering temperature.

It is contemplated that there are numerous modifications of the embodiments described herein, which are still within the scope of the invention as defined by the appended claims. For instance, the steps performed by a local control unit may wholly or in parts be performed by the central server. The steps of the method may further be performed in a different order, where some steps are performed in parallel.

The invention claimed is:

1. A method for controlling a thermal distribution system, the system comprising:
   a distribution grid for a fluid based distribution of heat and/or cold,
   a production plant for producing heat or cold and for delivering the heat or cold to the distribution grid, and
   a plurality of local controllers, each local controller being associated with a local distribution system in a building, the local distribution system being configured to distribute heating or cooling in the building, each local controller further being configured to control the associated local distribution system's outtake of heat or cold from the distribution grid,
   wherein the method comprises:
   determining a capacity limit of the production plant,
   evaluating, at a central server, a current and/or forecasted production of heat or cold in the production plant in relation to the capacity limit of the production plant,
   in response to the current and/or forecasted production at the production plant approaching the capacity limit, outputting, from the central server, a respective control signal to one or more of the plurality of local controllers, wherein the respective control signal comprises information pertaining to a temperature offset,
   receiving the respective control signal at the respective one or more of the plurality of local controllers, and
   in response to receiving the respective control signal at the respective one or more of the plurality of local controllers, determining a respective steering temperature based on a temperature outside and/or inside the respective building and on the respective temperature offset, and controlling, at the respective one or more of the plurality of local controllers, the associated local distribution system's outtake of heat or cold from the distribution grid based on the steering temperature, and thereby reducing the associated local distributions system's outtake of heat or cold from the distribution grid.

2. The method according to claim 1, wherein the evaluating of the current and/or forecasted production of heat or cold in the production plant in relation to the capacity limit of the production plant is performed periodically.

3. The method according to claim 1, further comprising:
   setting a production threshold value lower than and related to the capacity limit of the production plant,
   wherein the evaluating of the current and/or forecasted production of heat or cold in the production plant in relation to the capacity limit of the production plant comprises comparing the current production with the production threshold value, and
   wherein, upon the current production reaching the production threshold value, determining that the current production at the production plant approaches the capacity limit.

4. The method according to claim 1, wherein the steering temperature is a set-point temperature for a regulator regulating the temperature of a feed of heat transfer fluid in the local distribution system.

5. The method according to claim 1, further comprising producing heat or cold at the production plant.

6. The method according to claim 1, further comprising:
   determining, at at least one of the one or more of the plurality of local controllers, a base steering temperature for the associated local distribution system based on the temperature outside and/or inside the associated building,
   determining a return temperature of a return of heat transfer fluid in the associated local distribution system,
   upon the determined respective steering temperature being lower than the return temperature, determining a temporary steering temperature being higher than the return temperature and lower than the base steering temperature, and
   controlling the associated local distribution system's outtake of heat from the distribution grid based on the temporary steering temperature.

7. The method according to claim 6, further comprising:
   over time, determining the return temperature of the return of heat transfer fluid in the associated local distribution system,
   gradually decreasing the temporary steering temperature while securing that the temporary steering temperature is greater than the return temperature, until the temporary steering temperature reaches the steering temperature.

8. The method according to claim 6, further comprising:
until the temporary steering temperature reaches the steering temperature:
- over time determining a temperature of a feed of heat transfer fluid in the associated local distribution system, and
- in response to the determined feed temperature reaching the temporary steering temperature:
  - determining the return temperature of the return of heat transfer fluid in the associated local distribution system, and
  - determining a new temporary steering temperature being higher than the determined return temperature and lower than the previous temporary steering temperature.

9. The method according to claim 1, further comprising:
determining, at at least one of the one or more of the plurality of local controllers, a base steering temperature for the associated local distribution system based on the temperature outside and/or inside the associated building,
determining a return temperature of a return of heat transfer fluid in the associated local distribution system,
upon the determined respective steering temperature being higher than the return temperature, determining a temporary steering temperature being lower than the return temperature and higher than the base steering temperature, and
controlling the associated local distribution system's outtake of cold from the distribution grid based on the temporary steering temperature.

10. The method according to claim 9, further comprising:
over time determining the return temperature of the return of heat transfer fluid in the associated local distribution system,
gradually increasing the temporary steering temperature while securing that the temporary steering temperature is lower than the return temperature, until the temporary steering temperature reaches the steering temperature.

11. The method according to claim 9, further comprising:
until the temporary steering temperature reaches the steering temperature:
- over time, determining a temperature of a feed of heat transfer fluid in the associated local distribution system, and
- in response to the determined feed temperature reaching the temporary steering temperature:
  - determining the return temperature of the return of heat transfer fluid in the associated local distribution system, and
  - determining a new temporary steering temperature being lower than the determined return temperature and higher than the previous temporary steering temperature.

* * * * *